United States Patent [19]

Höfelt et al.

[11] Patent Number: 4,511,933
[45] Date of Patent: Apr. 16, 1985

[54] METHOD AND APPARATUS FOR RECORDING A DIGITAL INFORMATION SIGNAL

[75] Inventors: Martijn H. H. Höfelt; Edmond de Niet; Albert M. A. Rijckaert, all of Eindhoven, Netherlands

[73] Assignee: U.S. Philips Corporation, New York, N.Y.

[21] Appl. No.: 457,780

[22] Filed: Jan. 13, 1983

[30] Foreign Application Priority Data

Sep. 20, 1982 [NL] Netherlands ..................... 8203619

[51] Int. Cl.³ ..................... G11B 5/09; G11B 21/10
[52] U.S. Cl. ..................... 360/47; 360/77
[58] Field of Search ................ 360/47, 77, 40

[56] References Cited

U.S. PATENT DOCUMENTS

4,354,208 10/1982 Maury ..................... 360/40

Primary Examiner—Vincent P. Canney
Attorney, Agent, or Firm—Thomas A. Briody; William J. Streeter; Edward W. Goodman

[57] ABSTRACT

For a controlled positioning of a read element relative to a track to be read during the read-out of such a record carrier, low-frequency tracking signals may be recorded in the tracks. Instead of adding separate tracking signals to the information signal, these tracking signals are represented by the d.c. content of the information signal. During conversion of the information words of the information signal into channel words steps are therefore taken to provide two channel words whose d.c. content is equal but opposite for each information word. The choice between these two channel words is made depending on a control signal which depends on the desired tracking signal.

12 Claims, 13 Drawing Figures

| I | W1 | W2 |
|---|---|---|
| 0 0 0 | 0 0 1 1 1 | 1 1 0 0 0 |
| 0 0 1 | 0 1 0 1 1 | 1 0 1 0 0 |
| 0 1 0 | 0 1 1 0 1 | 1 0 0 1 0 |
| 0 1 1 | 0 1 1 1 0 | 1 0 0 0 1 |
| 1 0 0 | 1 0 0 1 1 | 0 1 1 0 0 |
| 1 0 1 | 1 0 1 0 1 | 0 1 0 1 0 |
| 1 1 0 | 1 0 1 1 0 | 0 1 0 0 1 |
| 1 1 1 | 1 1 0 1 0 | 0 0 1 0 1 |

FIG. 3

| $L_I$ | $L_W$ | DC | $n_I$ | $n_W$ | E |
|---|---|---|---|---|---|
| 1 | 3 | 1/3 | 2 | 3 | 0,33 |
| 2 | 4 | 1/2 | 4 | 4 | 0,50 |
| 3 | 5 | 1/5 | 8 | 10 | 0,60 |
| 3 | 6 | 1/3 | 8 | 15 | 0,50 |
| 5 | 7 | 1/7 | 32 | 35 | 0,77 |
| 5 | 8 | 1/4 | 32 | 56 | 0,62 |
| 6 | 9 | 1/9 | 64 | 126 | 0,66 |
| 7 | 10 | 1/5 | 128 | 210 | 0,70 |
| 8 | 11 | 1/11 | 256 | 462 | 0,73 |
| 9 | 12 | 1/6 | 512 | 792 | 0,75 |
| 10 | 13 | 1/13 | 1024 | 1716 | 0,77 |
| 11 | 14 | 1/7 | 2048 | 3003 | 0,79 |
| 12 | 15 | 1/15 | 4096 | 6435 | 0,80 |
| 13 | 16 | 1/8 | 8192 | 11440 | 0,81 |

| $n \downarrow$ | $S \rightarrow$ 0 | 1 | 2 | 3 | 4 | 5 |
|---|---|---|---|---|---|---|
| 0 | 1 | 0 | 0 | 0 | 0 | 0 |
| 1 | 1 | 1 | 0 | 0 | 0 | 0 |
| 2 | P-- 1 | 2 | 1 | 0 | 0 | 0 |
| 3 | 1 | 3 | 3 | 1 | 0 | 0 |
| 4 | 1 | 4 | 6 | 4 | 1 | 0 |
| 5 | 1 | 5 | 10 | 10 | 5 | 1 |

| | | | |
|---|---|---|---|
| A | 0 0 X X X X X X X X X X X 0 0<br>0 0 X X X X X X X X X X X 1 1<br>1 1 X X X X X X X X X X X 0 0<br>1 1 X X X X X X X X X X X 1 1 | (113)<br><br>(77) | 190 |
| B | 0 1 1 X X X X X X X X X X 0 0<br>0 1 1 X X X X X X X X X X 1 1 | (39)<br>(19) | 58 |
| C | 1 0 0 X X X X X X X X X X 0 0<br>1 0 0 X X X X X X X X X X 1 1 | (40)<br>(29) | 69 |
| D | 0 0 X X X X X X X X X X 1 1 0<br>1 1 X X X X X X X X X X 1 1 0 | (39)<br>(19) | 58 |
| E | 0 0 X X X X X X X X X X 0 0 1<br>1 1 X X X X X X X X X X 0 0 1 | (40)<br>(29) | 69 |

METHOD AND APPARATUS FOR RECORDING A DIGITAL INFORMATION SIGNAL

BACKGROUND OF THE INVENTION

The invention relates to a method of recording a digital information signal in information tracks of a record carrier, which method comprises the conversion of consecutive information words of the applied digital information signal into channel words of a selected channel code prior to recording, which channel code has been selected so that for each information word of the applied digital information signal, a first and a second channel word are available, the first channel word forming part of a group of permissible channel words with a d.c. content unequal to zero and the second channel word being the complement of the first channel word.

The invention also relates to a recording apparatus for carrying out the method, a record carrier provided with a digital signal obtained by means of this method, and a read apparatus for such a record carrier.

Such a method is known, for example, from an article in NTZ, 1970, Heft 1, pp. 11-16, entitled "Zusammenstellung und Gruppierung verschiedener Codes für die Uebertragung digitaler Signale". In the case of the so-called Bimode-Code described in this article on page 12 under 2.3.b., each information word of the information signal yields two channel words with identical but opposite d.c. content for the conversion of the applied digital signal into the channel code. The choice between the two available channel words is then made depending on the d.c. content of the preceding channel words, steps being taken to minimize the d.c. content of the digital signal to be recorded.

This code may be applied to binary signals for which each data bit of a channel word can assume only two possible values. Moreover, this code may also be applied to multivalent signals, i.e. signals for which each data bit of a channel word can assume more than two possible values, for example a ternary signal. A Bimode-code for such a ternary signal is also described in said article on page 15.

SUMMARY OF THE INVENTION

The invention aims at providing a method of the type mentioned in the opening paragraph which yields a very high information density on the record carrier without having to impose too critical demands on the read process of such a record carrier. In particular, it is the object of the invention to provide a method which permits active tracking control, i.e. a control positioning tracks during read-out of the record carrier without affecting the relliability of the signal read-out.

To this end the invention is characterized in that for generating a tracking signal, comprising a carrier wave of comparatively low frequency relative to that of the recorded information signal and, when recorded in the information tracks on the record carrier, intended to provide information about the position of a read element relative to the information track to be scanned, in a direction transverse to the track direction, a binary control signal is generated, the choice from the two channel words available for each information word being made depending on said binary control signal.

By the step in accordance with the invention it is achieved that the d.c. content of the recorded digital signal varies in the same way as the carrier wave of comparatively low frequency. This variation of the d.c. content may then be employed as a tracking signal during read-out of the record carrier. When a specific information track is read by a read element, the tracking signals recorded in the two adjacent information tracks produce a comparatively strong cross-talk in the read element because these tracking signals have the nature of a signal of comparatively low frequency (varying d.c. content). As the magnitude of the cross-talk from these two adjacent information tracks to the read element depends on the position of the read element relative to the information tracks to be read, the magnitude of these cross-talk signals may be used for deriving a control signal which represents the position of the read element relative to the information track to be read. This control signal may then be used for controlling the position of the read element relative to the information track to be read.

It is to be noted that the use of tracking signals of comparatively low frequency for controlling the position of a read element relative to the information tracks is known per se. Examples of the use of such tracking signals in recording and reading a video signal on/from a magnetic record carrier tape can be found in U.S. Pat. Nos. 4,056,832 (PHN 7630); 4,110,799 (PHN 8281) and 4,297,733 (PHN 8728). However, in all these cases the tracking signal to be recorded is added to the information signal to be recorded as a separate signal.

In the method in accordance with the invention however, no additional tracking signal is added to the digital signal to be recorded, but the coding is adapted in such a way that the d.c. content of the recorded digital signal represents this tracking signal. The recorded signal remains a purely digital signal, i.e. a purely binary signal when a binary code is used, and a purely ternary signal when a ternary code is used etc. This adds greatly to the reliability of the recording and read system. When the method in accordance with the invention is used, the approach adopted for the record tracking signals, i.e. the track-wise choice of the phase and/or frequency of these tracking signals, may for example be similar to the approach adopted in the above-mentioned Patent Specifications, so that for this reference is made to these Patent Specifications.

Preferably, the invention is characterized in that the first channel word forms part of a group of permissible channel words having the same d.c. content. This step ensures an optimum similarity between the varying d.c. content of the recorded digital signal and a low-frequency carrier wave.

A preferred embodiment of the method in accordance with the invention is characterized in that the information words of m data bits of the information signal are converted into binary channel words of n data bits, where $n!/p!(n-p)! \geq 2^m$, in which p is the prescribed number of data bits of a first type per channel word.

A further preferred embodiment of the method in accordance with the invention is characterized in that the first channel word forms part of a group of permissible channel words whose number of data bits is twice that of the information words of the information signal, each data bit being either preceded or followed by a data bit of the same value, at least within that sequence of data bits of a channel word which starts with the second data bit and ends with the penultimate data bit. As a result of this step, a highly efficient code can be obtained. Apparently, this efficiency is only 50% as a result of the conversion of the information words of n data bits into the channel words of 2n data bits. However, this drawback is largely mitigated if the group of channel words which comply with the requirements as regards the d.c. content only those channel words are admitted of which each data bit within the sequence of data bits starting with the second and ending with the penultimate data bit is either preceded or followed by a data bit of the same value.

In order to ensure that this criterion is also met during the transition of one channel word to another, a further preferred embodiment is characterized in that the group of permissible channel words contains words whose first data bit is not followed by a data bit of the same value, for such a channel word a substitute channel word is available which also meets the requirements imposed on the permissible channel words but which comprises a first data bit of a value which is complementary to the value of the first data bit of the associated channel word, a choice is made, depending on the value of the last data bit of the preceding channel word and the control signal, between the channel word and the substitute channel word in such a way that the first data bit of the word being used has the same value as the last data bit of the preceding channel word, and/or the group of permissible channel words comprises words whose last data bit is not preceded by a data bit of the same value and for such a channel word a substitute channel word is available which also meets the requirements imposed on the permissible channel words but which has a last data bit of a value which is complementary to the value of the last data bit of the associated channel word, a choice being made, depending on the value of the first data bit of the next channel word and the control signal, between the channel word and the substitute channel word in such a way that the last data bit of the word being used has the same value as the first databit of the next channel word.

The binary control signal for obtaining the varying d.c. component of the recorded digital signal may of course be generated directly by means of a generating circuit. If for recording this digital information use is made of an apparatus for recording a video signal as described in the foregoing, which apparatus already comprises a generating circuit for generating analogue tracking signals, said binary control signal may alternatively be derived from these analogue tracking signals.

In a very simple embodiment the control signal may then assume either of the two binary values depending on the polarity of the analogue tracking signal.

An apparatus for carrying out the method in accordance with the invention is characterized in that the apparatus comprises an encoding device comprising a first register with the first channel words and a second register with the second channel words, and a selection circuit for selecting a channel word depending on an applied information word and the value of the control signal.

A record carrier obtained in accordance with such a method is characterized in the d.c. content of the recorded digital signal at least substantially varies in the same way as a carrier wave whose frequency is low relative to the bit frequency of the digital signal.

DESCRIPTION OF THE DRAWINGS

The invention will now be described in more detail, by way of example, with reference to the drawing, in which.

DESCRIPTION OF THE PREFERRED EMBODIMENTS

Figure 1:
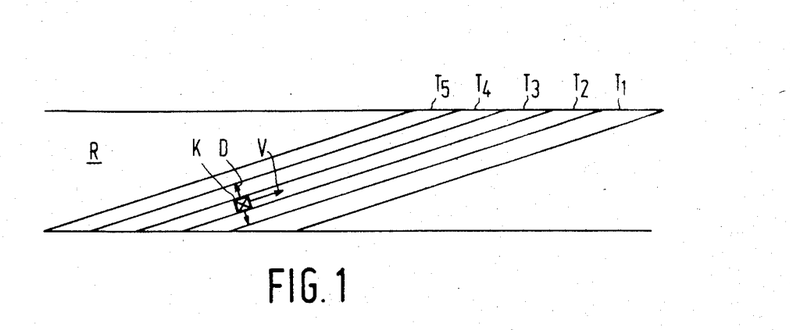
FIG. 1, by way of illustration, shows a magnetic record-carrier tape with the pattern of information tracks.

FIG. 1 by way of illustration shows a magnetic record-carrier tape as used in the aforementioned U.S. Pat. No. 4,297,733. For making recordings on and reading this record carrier R, use is made of the so-called helical-scan method, which means that the information tracks $T_1$ to $T_5$ extend at a small angle relative to the longitudinal direction of the tape and are consecutively recorded and/or read by means of a plurality of magnetic heads K which are mounted on a rotating head disk. In order to obtain a high information density. i.e. to permit the use of comparatively narrow information tracks, use is made of a positioning system by means of which the position of a scanning head K relative to the information track to be read is controlled. For this purpose the magnetic heads K may be arranged on piezoelectric actuators which in response to a control signal, can move the magnetic heads K in a direction transverse to the track direction, as is indicated by the arrows D. For positioning the magnetic heads K relative to the information track, it is alternatively possible to control the tape speed in response to this control signal.

Figure 2:
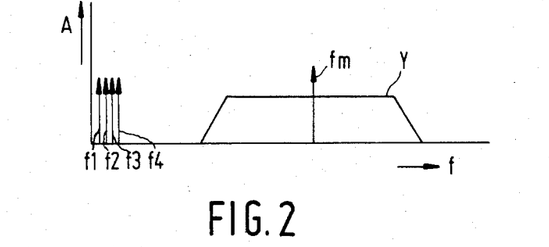
FIG. 2 shows the associated frequency spectrum of the information signal and the tracking signal.

In order to obtain the control signal required for this positioning, use is made of tracking signals which are recorded in the information tracks. The system as described in said U.S. Pat. No. 4,297,733, employs tracking signals which comprise carrier-wave signals of four different frequencies which are consecutively recorded in consecutive tracks. By way of illustration FIG. 2 shows a simplified frequency spectrum of the recorded signal. This signal comprises, for example, a carrier wave FM which is modulated with the recorded video signal and the tracking signals of four different frequencies $f_1$ to $f_4$, which occupy a frequency band below the frequency band of the information signal. When a specific track is read, the tracking signals recorded in the two adjacent information tracks are also read through cross-talk which arises as a result of the low-frequency character of the tracking signals. By comparing the magnitude of the two tracking signals, an error signal can be obtained which represents the positional deviation of the magnetic head K relative to the information track to be read. This error signal may then be applied to a control system for correcting this positional deviation.

Of course, such a record carrier, as shown in FIG. 1, which is first of all intended for recording analog information, may also be used for recording a digital information signal. In order to obtain a controlled positioning of the magnetic head K relative to the information track to be read, the same tracking signals as described with reference to FIG. 1 may then be used. During recording, these tracking signals would have to be added to the digital information signal. This has the drawback that the recorded signal is no longer a purely digital signal, which affects the reliability of the sysem. The invention aims at providing a method which permits tracking signals to be added to the digital information signal without thereby affecting the digital character of the recorded signal.

For this purpose the invention utilizes a special conversion of the applied digital information signal into the channel code for the record carrier. This conversion is illustrated by the table shown in FIG. 3. Use is made of a digital information signal which is divided into a sequence of information words I of three data bits. These information words I are converted into channel words of five data bits. From the total number of five data bit channel words available (32), a first group $W_1$ is formed, which group comprises channel words of three data bits of the logic level "1" and two data bits of the logic level "0". This means that these words $W_1$ all have the same d.c. component, the term "d.c. component" being understood to mean the inequality of the number of data bits of the logic value "1" and the number of data bits of the logic value "0".

Figure 3:
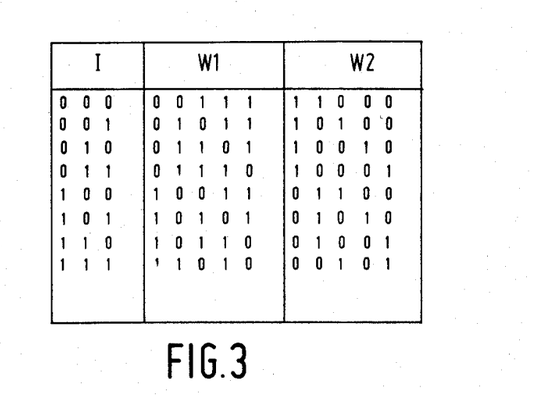
FIG. 3 is a table illustrating the encoding systems used in the method in accordance with the invention.

A second group of channel words $W_2$ comprises channel words which are the complement of the channel words of the group $W_1$, and which therefore all have the same d.c. component which is opposite to the d.c. component of the words $W_1$. Thus, for each information word I, two channel words ($W_1$, $W_2$) are available which have equal but opposite d.c. components.

Figure 5:
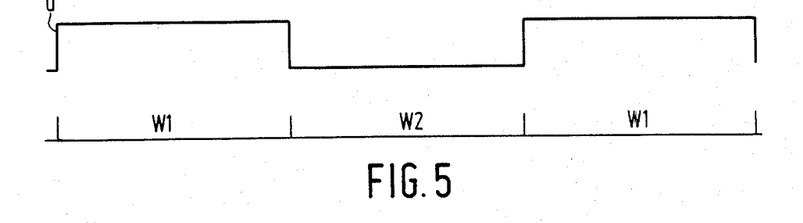
FIG. 5 illustrates the method of generating the tracking signals in accordance with the invention.

In accordance with the invention, the choice between the two available words $W_1$ and $W_2$ during the conversion of an information word, I into a channel word is made depending on a binary control signal U. This is illustrated in FIG. 5, which shows a symmetrical periodic control signal U. If this control signal U has a logic value "1", the channel word of the group $W_1$ associated with the relevant information word I is selected. However, if the control signal U has the logic value "0", the channel word of the group $W_2$ associated with the relevant information word I is selected, as is indicated in FIG. 5. It is found that the d.c. content of the converted digital signal varies in the same way as the control signal U. During the half-cycle of the control signal U in which words of the group $W_1$ are selected all words of the channel signal have a positive d.c. content and during the half-cycle of the control signal U in which words of the group $W_2$ are selected these words have a negative d.c. content. As a result of this, the d.c. content of the converted digital signal alternates in conformity with the control signal U. If this control signal U is varied in conformity with a tracking signal to be recorded, the d.c. content of the recorded digital signal will vary in the same way as this tracking signal. When the digital information of the record carrier is read, this varying d.c. content of the digital signal results in a low-frequency component which fully corresponds to the desired tracking signal. However, the signal recorded on the record carrier remains purely digital, which adds to the reliability of the system.

Figure 4:
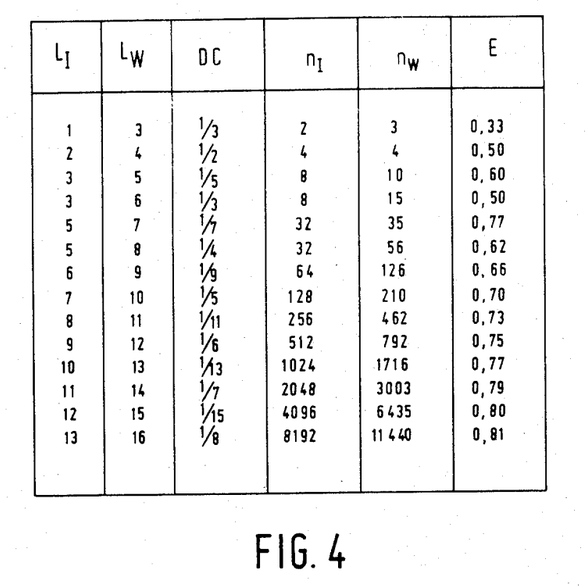
FIG. 4 is a table illustrating the conversions which are then possible.

The table shown in FIG. 4 schematically lists a number of possible conversions for a binary signal. The column $L_I$ indicates the length of the applied information word, i.e. the number of data bits forming this information word. The column $L_W$ indicates the length of the channel words. The column DC indicates the relative d.c. content of the channel words, namely the inequality between the number of data bits of a logic value "1" and the number of data bits of a logic value "0" related to the total number of data bits per channel word. The column $n_I$ indicates the number of information words to be converted and the column $n_W$ the number of channel words available which meet the requirement as regards the d.c. content. Finally, the column E indicates the conversion efficiency. For example, in the case of a conversion of information words comprising two data bits into channel words comprising four data bits, this efficiency will be 50%. The table shows that this efficiency increases as the length of the information words and the channel words increases. However, an increasing length of these words also means that the required electronics become more intricate, so that a compromise will have to be found for this. A conversion of information words of five data bits into channel words of seven data bits then seems to be a satisfactory compromise.

Figure 6:
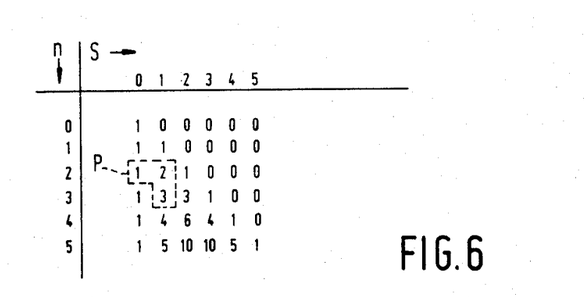
FIG. 6 is a table from which the number of available channel words with a specific d.c. content can be derived.

The number of channel words available which meet a specific requirement as regards the d.c. content may simply be determined by means of Pascal's triangle, as is illustrated in FIG. 6. The number of data bits of the logic value "1" of the data words is plotted horizontally and the number of data bits of the channel words is plotted vertically. As is known, each number within Pascal's triangle is obtained by summation of the value directly above it and the value to the left of it, as is illustrated by the block P. If, for example, channel words of 5 data bits and a positive relative d.c. content of 1/5 should be used, this means that the available number of words $n_w(10)$ is found in the column s=3 and the row n=5. The number of available words may also be expressed by the following formula $$n_w = \binom{n}{s} = \frac{n!}{s!(n-s)!} .$$

Figure 7:
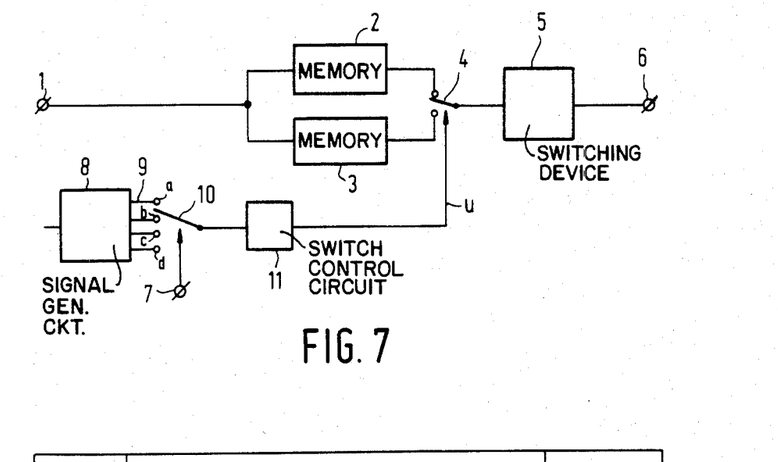
FIG. 7 schematically shows an embodiment of an apparatus for carrying out the method.

FIG. 7 shows an embodiment of an apparatus for carrying out the inventive method. This apparatus comprises two memories 2 and 3 in which the channel words of the group $W_1$ and $W_2$, respectively, of the channel code are stored. These two memories 2 and 3 are connected to an input terminal 1 to which the words of the applied digital information signal are supplied. Via this input terminal 1, the channel word in the memory 2 or 3 associated with the applied information word is selected. The two selected channel words become available on the two outputs of the memories 2 and 3, after which via a switch 4, one of these two words is applied to a switching device 5. In this switching device 5, the applied digital signal is converted into a recording signal suitable for the recording medium which is used. For recording on a magnetic record carrier, for example, a positive or negative write current will be generated, depending on the binary value of the applied binary signal.

The switch 4 is controlled in response to the control signal U. This control signal U is supplied by a switch control circuit 11, which, via a switch 10, is connected to a signal generating circuit 8. This signal generating circuit 8 comprises, for example, four outputs 9a to 9d, on which the four tracking signals of the respective frequencies f1 to f4 as shown in FIG. 2 become available. The switch 10 is actuated by a control signal which is applied to an input terminal 7, which control signal is for example derived from the head disk for the magnetic heads in the apparatus used in conjunction with the record carrier shown in FIG. 1. As a result of this, tracking signals which consecutively have the frequencies f1 to f4 are applied to the input of the switching device 11 in a cycle corresponding to four information tracks. From these analog tracking signals, the switch control circuit 11 derives the desired binary control signal U. For this purpose, this switch control circuit 11 may comprise a polarity detector which supplies a binary output signal which depends on the polarity of the applied tracking signal.

Figure 8:
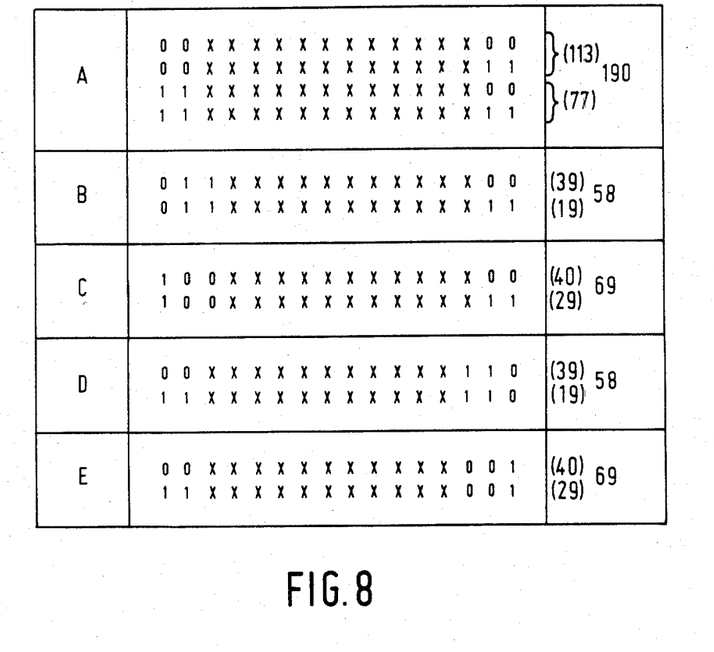
FIG. 8 is a table showing a conversion which may be used in conjunction with the method in accordance with the invention and which permits a high efficiency to be obtained.

The table in FIG. 8 schematically shows an example of a conversion which may be used in the method in accordance with the invention and by means of which a very high efficiency can be achieved. It is assumed that an information signal is used which is divided into information words of eight data bits. These information words are converted into channel words comprising a number of data bits equal to twice the number of the information words, i.e. sixteen data bits with a relative d.c. content of $\frac{1}{8}$, i.e. 9 data bits of the logic value "1" and 7 data bits of the logic value "0" (or the complement). Normally speaking such a conversion yields an efficiency of only 50%, because as a result of the use of a clock signal of twice the frequency of the clock signal for the information words, the sixteen-bit channel words are compressed into a time interval equal to the time interval of these information words, which would double the frequency band required for the channel code.

In order to preclude this, a highly selective choice is made from the total number of sixteen-bit channel words available. Firstly, a group of channel words A is admitted, each data bit of this channel word being either preceded or followed by a data bit of the same value. These data words are schematically shown in the second column of FIG. 8 in which, for the sake of simplicity only the possible binary values of the first two and the last two data bits are indicated. The value x entered for the other data bits means that such a data bit may assume either of the two possible binary values, while of course the aforementioned criterion must be met. The total number of words which meets the criterion for group A is found to be 190, as is indicated in column 3. Each of these channel words of group A consequently has the same positive d.c. content. Associated with this group A is a group $\overline{A}$, comprising channel words which are the complement of the channel words of group A and which consequently all have the same negative d.c. content.

Since the number of channel words required is 256 ($2^8$), this means that it will be necessary to accept words which do not entirely meet the criterion for group A. First of all, channel words of group B are used for this, which words fully meet the criterion of group A, except for the first data bit. As can be seen in column 2, this first data bit has the binary value "0" and it is not followed by a data bit of the same value. This means that if such a channel word is preceded by a channel word which ends with a data bit of the binary value "1", an isolated data bit of the value "0" occurs in the channel-bit stream, which leads to an extension of the frequency bandwidth of this data-bit stream. In order to preclude this, channel words of a group C are admitted in addition to the channel words of group B. These channel words of group C are arranged in a fully identical manner as the channel words of group B, with the proviso that the first data bit of these channel words has the logic value "1" instead of the logic value "0". For each data word belonging to a channel word of group B, a channel word of group C is available. If now, depending on the binary value of the last bit of the preceding channel word, for the value of the control signal U either the corresponding channel word of group B, of group C, of group $\overline{B}$, or of group $\overline{C}$ is selected, it can be achieved that the first data bit of such a channel word is also preceded by a data bit of the same value. This means that groups B and C together yield 58 channel words which are available for the channel code, namely the number of channel words in the smaller of the two groups. Together groups A, B and C consequently yield 248 channel words which are available.

The residual channel words that are required are selected from groups D and E. Both groups again fully meet the requirements imposed on group A, except for the last data bit which in group D has the binary value zero and in group E the binary value one. If, in a similar way as for the groups B and C, a word of group D, group E, group $\overline{D}$ or group $\overline{E}$ is selected but now depending on the value of the first data bit of the next channel word, it can be achieved again that no isolated zero or isolated one occurs in the data-bit stream.

If a channel word of the type D/E is followed by a channel word of the type B/C, the first data bit of the following channel word is still indeterminate. In that case, however, an arbitrary choice may be made for the D/E word, because the requirement that no isolated data bits may occur can be met by the subsequent choice of the B/E word.

A second complication occurs if a sequence of a number of channel words of the type D/E occurs. Also in that case the first data bit of the next channel word is unknown, unless one proceeds to the instant at which again a channel word of the type A or B/C occurs. However, this problem may be overcome simply by choosing the channel words which correspond to a similar information word in groups D and E and which have the same two starting bits, i.e. "00" or "11". Thus, depending on the information word and the control signal U, it is certain which starting bit the next channel word will have, regardless of whether this will be a word of group D or group E. As can be seen in FIG. 8, group D comprises 39 words starting with "00" and group E comprises 40 such words, so that 39 pairs of channel words within the group D/E possibly start with "00". Furthermore, it can be seen that 19 pairs of channel words are possible which start with "11". Even for this choice of the channel words, there is a substantial surplus of available words. When choosing the words to be used, it is therefore possible to impose other requirements, for example, requirements as regards the maximum number of consecutive data bits of the same value, which is of importance in deriving a clock signal from the data-bit stream during decoding.

This special choice of the permissible channel words results in a high efficiency. However, in the case of this coding method, transitions between the two binary values occur in the channel words at locations halfway the bit cells of the applied information signal, so that more stringent requirements are imposed on the detector during read out.

Figure 9:
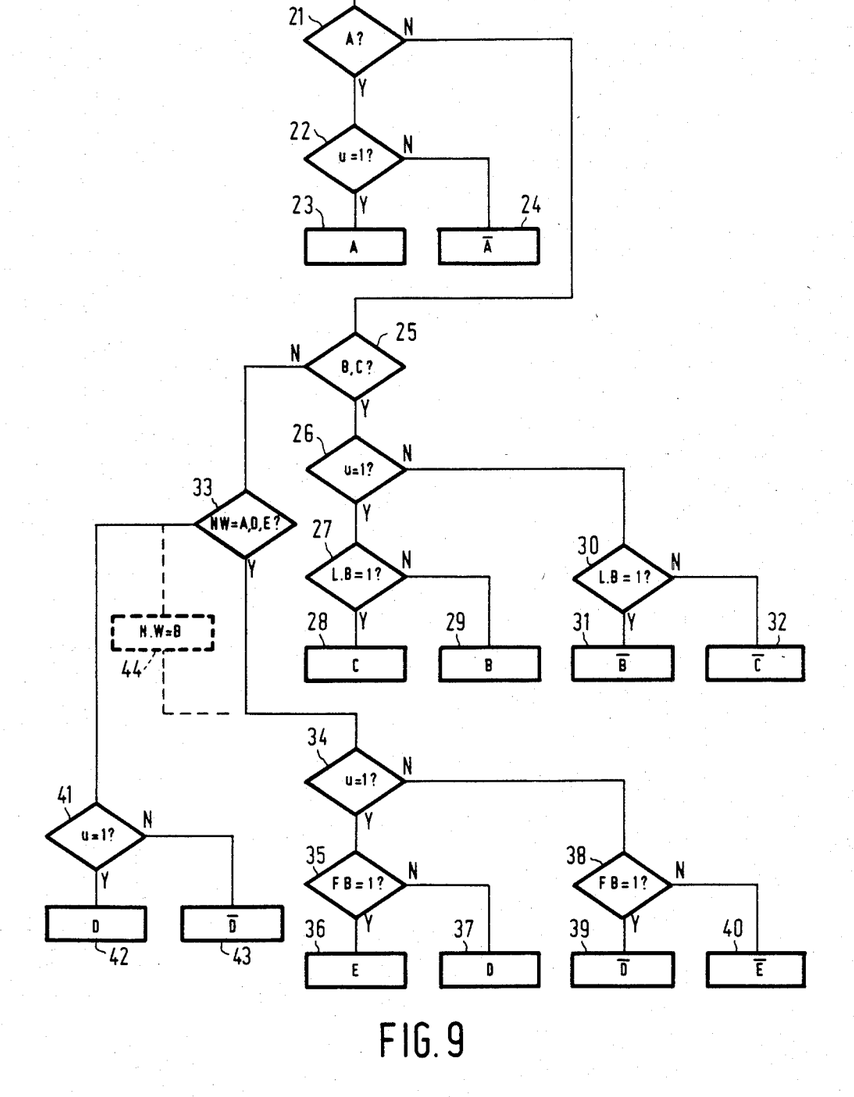
FIG. 9 shows a flow diagram which may be used in conjunction with this conversion.

FIG. 9 is a flow diagram for the conversion in accordance with the channel code shown in FIG. 8. In block 21 it is ascertained whether the channel word to be generated belongs to group A. If this is the case it is ascertained in block 22 whether the control signal U has the value "1". Should this be the case, channel word A is generated via block 23. If not, the complementary channel word $\overline{A}$ is generated via block 24. If the word to be generated does not belong to group A, it is ascertained via block 25 whether the channel word to be generated belongs to the group B/C. If it does, it is ascertained via block 26 whether the control signal U has the value "1"; if this is so, then it is ascertained via block 27 whether the last bit of the preceding channel word has the value "1". If this is so, the desired channel word of group C is generated via block 28. However, if the last data bit of the preceding word has the value "0", the desired channel word of group B is generated via block 29. If it follows from block 26 that the control signal U has the value "0", it is ascertained via block 30 whether the last data bit of the preceding word has the value "1". In that case the desired channel word of group $\overline{B}$ is generated via block 31. However, if the last data bit of the preceding channel word has the value "0", the desired channel word of group $\overline{C}$ is generated via block 32. If the channel word to be generated does not belong to one of the two groups B and C, it is ascertained via block 33 whether the next channel word is of the type A or D/E. Should this be the case, then it is ascertained via block 34 whether the control signal U has the value "1". If this is so, it is ascertained via block 35 whether the first bit of the next channel word has the value "1", whilst of course allowance is made for the value of the control signal U for this channel word. In this case the desired word of the group E is generated via block 36. However, if the first data bit of the next channel word has the value "0", the desired channel word of group D is generated via block 37. If the result of block 34 is that the control signal U has the value "0", it is ascertained via block 38 whether the first data bit is the next channel words has the value "1". In that case the desired channel word of group $\overline{D}$ is generated via block 39. If not, the desired channel word of group $\overline{E}$ is generated via block 40. If the result of block 33 is that the next word is of type B/C, it is ascertained via block 41 whether the control signal U has the value "1". In that case the desired channel word of group D is generated via block 42, and if this is not the case the channel word of group $\overline{D}$ is generated via block 43. This means that an arbitrary choice is made from group D/E. Alternatively, instead of the blocks 41 to 43, it is possible to assure via a block 44 that the next channel word shall be of the type B, after which the channel word to be generated is chosen via blocks 34 to 40.

Figure 10:
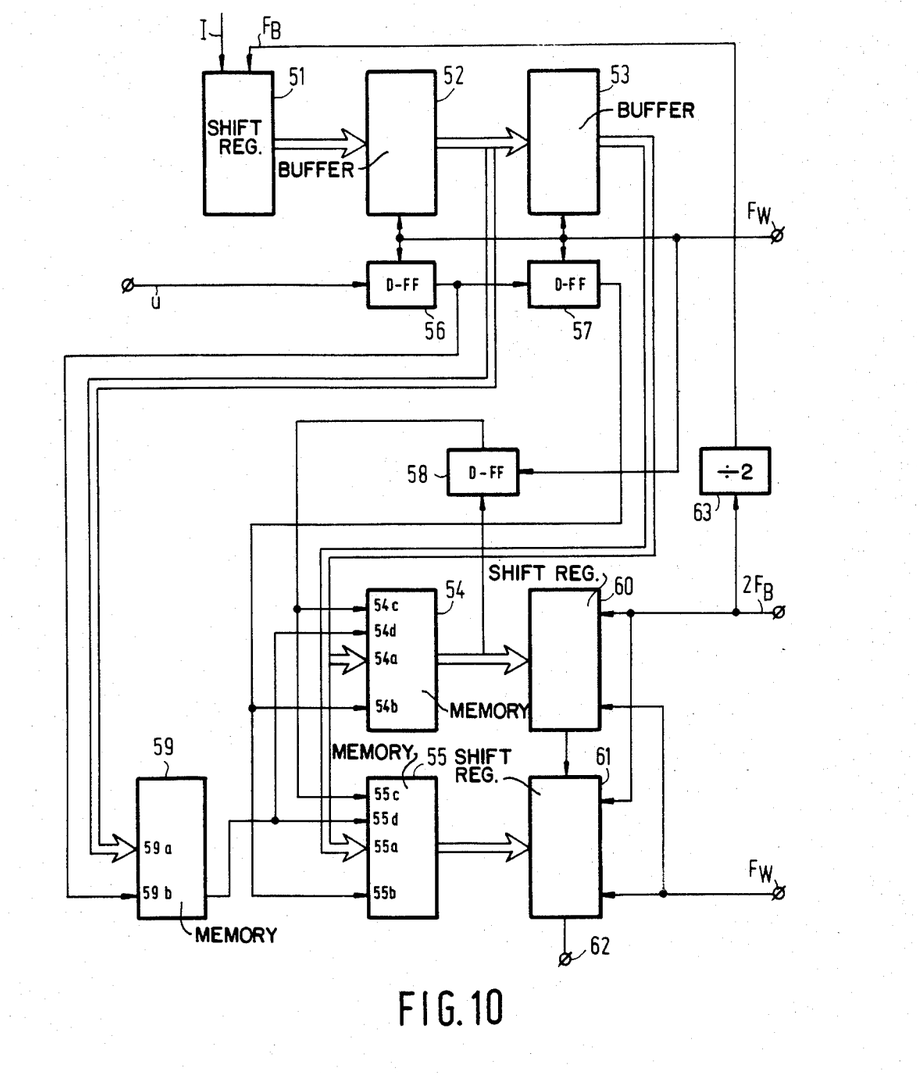
FIGS. 10 and 11 show two versions of an encoding device.

FIG. 10 shows a version of a device for implementing the flow diagram shown in FIG. 9.

The device comprises an 8-bit shift register 51 having an input for receiving the data bits of the information signal I, for which purpose this shift register is controlled by a clock signal $F_B$ of a frequency equal to the bit frequency of the information signal I. The 8 outputs of this shift register 51 are connected to 8 inputs of a buffer stage 52 which is clocked by the word synchronization signal $F_W$. For the sake of simplicity the 8-wire connections required for this purpose are represented by the double-arrow connection. Said buffer stage 52 consequently takes over an information word of the information signal I from the shift register 51. An identical buffer stage 53 is arranged in series with said buffer stage 52, so that always two consecutive information words of the information signal I are available on the outputs of these two buffer stages.

The output of the buffer stage 53 is connected to the inputs 54a and 55a, respectively, of two read-only-memories 54 and 55, (ROM's) 54 and 55. In these memories all the channel words to be used of the groups A through E and their complements are stored, the memory 54 containing the 8 least-significant data bits of the channel words and the memory 55 the 8 most-significant data bits. The selection of the desired channel word from these two memories is effected under the influence of the information word applied to the inputs 54a and 55a and the value of the logic signals applied to the inputs 54b, c, d and 55b, c, d. The value of the control signal U corresponding to the relevant information word is applied to the inputs 54b and 55b. For this purpose said control signal U is applied to a flip-flop 56, which is clocked by the word-synchronization signal Fw, in series with which a similar flip-flop 57 is arranged, whose output is connected to the two memories 54 and 55. The inputs 54c and 55c of the memories 54 and 55 are connected to the output of a clocked flip-flop 58, whose input is connected to the last output of the memory 54 and which consequently receives the last data bit of the channel word generated by the memories 54 and 55. Consequently, this flip-flop 58 supplies the information about the last data bit of the preceding channel word required for the generation of a type B/C channel word.

The information about the value of the first data bit of the next channel word required for generating a type D/E word is applied to the inputs 54d and 55d of the memories 54 and 55 and is generated by a memory 59 which is identical to the memory 55. This memory 59 consequently generates the 8 most-significant data bits of a channel word (of which only the first data bit is used) depending on the information word supplied by the buffer stage 52 and the corresponding value of the control signal U supplied by the flip-flop 56.

The two 8-channel outputs of the memories 54 and 55 are connected to two shift registers 60 and 61, which function as parallel/series converters, which receive the channel words from the memories 54 and 55 under control of the word-synchronization signal Fw, and which supply the data bits serially to an output terminal 62 under control of a clock signal $2F_B$ having a frequency which is twice the bit frequency $F_B$. Obviously, all the clock signals used are synchronized with each other, which can be achieved simply via a divide-by-two circuit 63 for the clock signals $F_B$ and $2F_B$.

Figure 11:
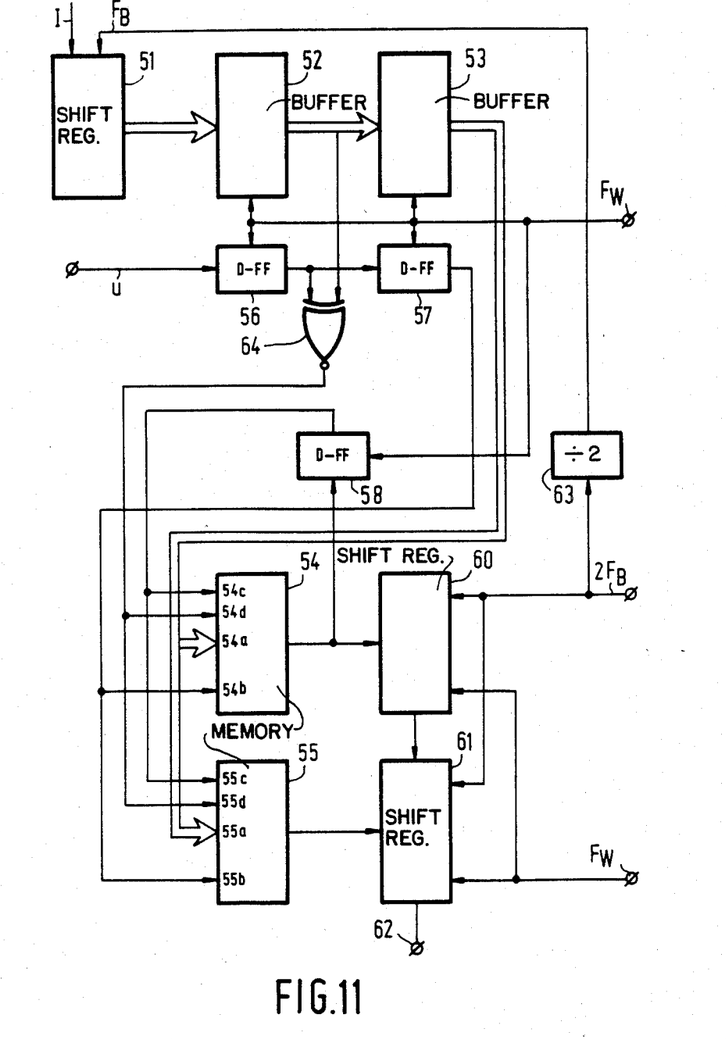

FIG. 11 shows a second version of a device for converting the information signal I into the channel signal, similar elements bearing the same reference numerals as in FIG. 10. The device largely corresponds to that shown in FIG. 10. The only difference between the two is that when selecting the permissible channel words, a special choice is made. Specifically, steps have been taken to ensure that for all permissible channel words of the groups A, D and E, the first data bit of the channel word is equal to the first data bit of the corresponding information word. This means that when a type D/E word is generated the first data bit of the next channel word need no longer be available, because this data bit corresponds to the first data bit of the next information word. Instead of the memory 59, the device shown in FIG. 11 therefore comprises only an exclusive-OR gate 64, to which the first data bit of the next information word on the output of the buffer stage 52 and the associated control signal U are applied.

Figure 12:
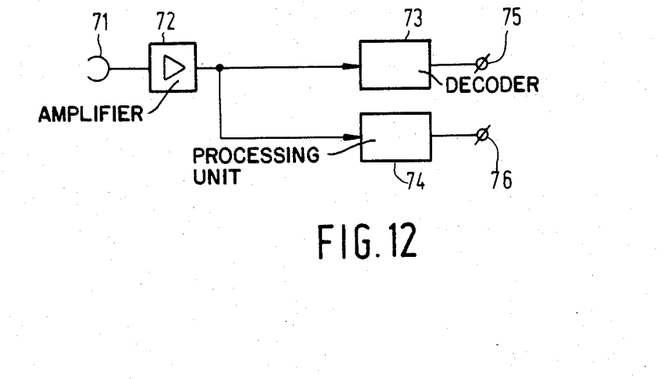
FIG. 12 schematically shows an apparatus for reading a record carrier, in particular the elements required for extracting the tracking signals.

FIG. 12 schematically shows an apparatus for deriving the digital information and the tracking signals from the signal read. The signal which is read by a read element 71, for example a magnetic head, is firstly amplified in an amplifier 72. This amplified signal is applied to a decoding device 73 in which the original digital information signal is recovered from the signal read. For this decoding purpose this device 73, in the customary manner, comprises a clock-signal generating device and a decoding circuit. On the output of this device 73, the output terminal 75, the original digital information signal becomes available. The signal amplified by the amplifier 72 is also applied to a processing unit 74 in which the tracking signals are extracted from the amplified signal, from which tracking signals an error signal is derived which represents a positional error of the read element 71 relative to the information track to be read, which error signal is available on an output terminal 76 and may be applied to a suitable servo control unit. For possible versions of the processing unit 74 reference is made to the aforementioned United States Patent Specifications.

It will be evident that the manner in which this error signal is used for positioning the read element is of subordinate importance for the present invention. Moreover, it is obvious that the format of the tracking signals as such is neither essential. In all those cases which, by means of a specific pattern of analog tracking signals recorded in the information tracks, enable an error signal to be generated which represents the position of the read element relative to the information track to be scanned, the steps in accordance with the invention may be used. Suitably, care is taken that the word frequency of the digital information signal is an integral multiple of the frequencies of the tracking signals used, so that an integral number of words of the information signal can be accommodated within one period of the control signal. An optimum choice is obtained if the word frequency is an even multiple of these frequencies of the tracking signals.

As regards the shape of the tracking signal U, several variants are possible. When an analog tracking signal is available, the control signal U may be generated very simply by means of a polarity detector. The resulting variation of the d.c. content, as already stated, is rectangular. It may also be attempted to make this variation more sinusoidal by generating a control signal which within a half-cycle of the analog tracking signal, also exhibits an alternation of the two possible binary values, the discrete pulse-width modulation representing sine-wave (for example by a Sigma-Delta-Modulation of the analog tracking signal). However, this is possible only if the word frequency is substantially higher than the frequency of the tracking signals.

Figure 13:
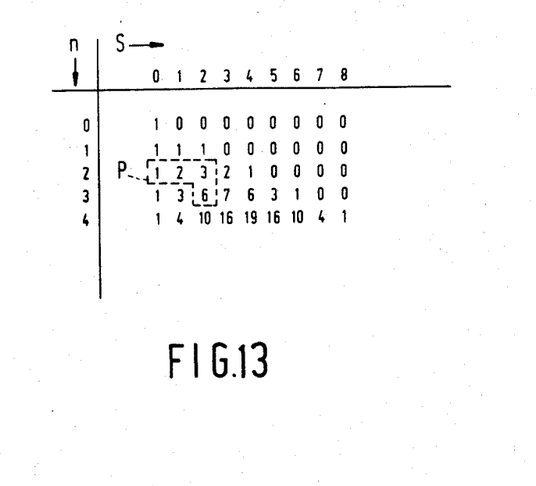
FIG. 13 shows a table from which the number of available words with a specific d.c. content can be derived for a ternary signal.

Furthermore, it has already been stated that the invention may also be used in the case of multivalent signals, for example ternary signals. By way of illustration, the table in FIG. 13, in the same way as that in FIG. 6, shows the number of available channel words with a specific d.c. content for a ternary signal. This d.c. content S is then the sum of the values of the data bits in a channel word, the possible values being 0, 1 and 2. Each value in the table is now formed by the sum of the value directly above it and the two values to the left of it, as is illustrated again by the block P.

What is claimed is:

1. A method of recording a digital information signal into information tracks on a record carrier, in which at least one tracking signal, comprising a selected carrier wave of comparatively low frequency relative to that of information in said digital information signal, is used to provide information about the position, transverse to the track direction, of a read head relative to the information track to be scanned, characterized in that said method comprises the steps:
   converting each of consecutive information words in said digital information signal into a first and a second channel words, wherein said first channel word forms part of a group of permissible channel words having a d.c. content unequal to zero and said second channel word is the complement of said first channel word;
   generating a binary control signal from said tracking signals, wherein the binary control signal is dependent on the frequency of said tracking signal;
   alternately selecting said first or second channel word under control of said binary control signal; and
   recording said selected control word on said record carrier, whereby the tracking signal is encoded in the d.c. content of the channel words.

2. A method as claimed in claim 1, characterized in that the first channel word forms part of a group of permissible channel words having the same d.c. content.

3. A method as claimed in claim 2, characterized in that the information words of the information signal comprise m data bits and are converted in binary channel words of n data bits, where $$\frac{n!}{p!\,(n-p)!} \geq 2^m,$$

in which m and n are integers and p is the prescribed number of data bits of a first type for each channel word.

4. A method as claimed in claim 1, characterized in that the first channel word forms part of a group of permissible channel words having a number of data bits which is twice the number of data bits in the information words of the information signal, each data bit being either preceded or followed by a data bit of the same value, at least within that sequence of data bits of a channel word which starts with the second data bit and ends with the penultimate data bit.

5. A method as claimed in claim 4, in which the data bits of each channel word assume one of two possible values and the group of permissible channel words includes further channel words whose first data bit is not followed by a data bit of the same value, characterized in that when said channel word is among said further channel words, said method further comprises the steps of:

comparing a last data bit of an immediately preceding channel word with a first data bit of said channel word; and replacing said channel word with a new channel word if the last bit of said immediately preceding channel word is different from the first bit of said channel word, wherein said new channel word is within said group of permissible channel words with the exception that the value of a first data bit is complementary to the value of the first data bit of said channel word.

6. A method as claimed in claim 4 or 5, characterized in that at least all channel words which meet the criterion that each data bit is preceded or followed by a data bit of the same value and all channel words which, except for the first data bit, meet this criterion, comprise a first data bit whose value corresponds to the value of a first data bit of an associated information word.

7. A method as claimed in claim 4, in which the data bits of each channel word assume one of two possible values and the group of permissible channel words includes further channel words whose last data bit is not preceded by a data bit of the same value, characterized in that when said channel word is among said further channel words, said method further comprises the steps:

comparing a last data bit of said channel word with a first data bit of a following channel word; and replacing said channel word with a new channel word if the last data bit of said channel word is different from the first data bit of said following channel word, which first data bit is also dependent on said binary control signal, wherein said new channel word is within said group of permissible channel words with the exception that the value of a last data bit is complementary to the value of the last data bit of said channel word.

8. A method as claimed in claim 7, characterized in that each of said channel words of the permissible channel words whose last data bit is not preceded by a data bit of the same value, includes a first data bit having the same value as a first data bit of the corresponding new channel word.

9. A method as claimed in claim 1, characterized in that the binary control signal is derived from an analog tracking signal and assumes either of two binary values depending on the polarity of said analog tracking signal.

10. Apparatus for recording a digital information signal into information tracks on a record carrier, in which tracking signals, comprising selected carrier waves each of comparatively low frequency relative to that of information in said digital information signal, are used to provide information about the position, transverse to the track direction, of a read head relative to the information track to be scanned, characterized in that said apparatus comprises:

means for generating a binary control signal from said tracking signals, wherein the binary control signal is dependent on the frequency of a selected one of said tracking signals; and an encoding device to which consecutive information words in said information signal are applied, said encoding device including a first register for storing first channel words, a second register for storing second channel words, and a selection circuit for selecting one of said first or second channel words depending on said information word and said binary control signal, wherein said first channel word forms part of a group of permissible channel words having a d.c. content unequal to zero and said second channel words are the complements of said first channel words, respectively, and wherein said binary control signal controls which of said registers is selected, whereby the tracking signals are encoded in the d.c. content of the selected channel words.

11. A record carrier obtained by means of the apparatus as claimed in claim 10, characterized in that the d.c. content of the recorded digital signal at least substantially varies in the same way as a carrier wave whose frequency is low relative to the bit frequency of the digital signal.

12. An apparatus for reading a record carrier as claimed in claim 11, characterized in that the apparatus comprises a detection circuit for extracting the variable d.c. content from the signal read and deriving from said variable d.c. content an error signal which represents the positional error of the read element relative to the information track to be read.

* * * * *